United States Patent [19]

Adams et al.

[11] Patent Number: 5,452,348
[45] Date of Patent: Sep. 19, 1995

[54] AUTOMATIC CALL DISTRIBUTION SYSTEM WITH EMERGENCY CONFERENCING AND METHOD

[76] Inventors: David J. Adams, 3S601 Behrs Circle Dr. West, Warrenville, Ill. 60555; Brian J. Shapley, 7801 Woodward Ave., Apt. 1B, Woodridge, Ill. 60517

[21] Appl. No.: 16,623

[22] Filed: Feb. 12, 1993

[51] Int. Cl.[6] .............................................. H04M 3/56
[52] U.S. Cl. .................................... 379/202; 379/266; 379/309
[58] Field of Search ............... 379/201, 202, 203, 204, 379/205, 206, 207, 265, 266, 158, 112, 113, 309, 48

[56] References Cited

U.S. PATENT DOCUMENTS

| | | | |
|---|---|---|---|
| 3,544,727 | 4/1968 | Sloan et al. | 379/205 |
| 4,150,259 | 4/1979 | Fenton et al. | 379/205 |
| 4,289,934 | 9/1981 | Pitroda et al. | 379/265 |
| 4,291,199 | 9/1981 | Densmore et al. | 379/164 |
| 4,317,961 | 3/1982 | Johnson | 379/204 |
| 4,451,705 | 5/1984 | Burke et al. | 375/309 |
| 4,600,814 | 7/1986 | Cunniff et al. | 379/202 |
| 5,008,930 | 4/1991 | Gawrys et al. | 379/210 |
| 5,077,788 | 12/1991 | Cook et al. | 379/214 |
| 5,195,087 | 3/1993 | Bennett et al. | 379/202 |
| 5,309,513 | 5/1994 | Rose | 379/309 |
| 5,392,329 | 2/1995 | Adams et al. | 379/49 |

OTHER PUBLICATIONS

"AT&T Network Systems, SESS © Switch ACD/MIS Telemarketing Services Applications Guide", Aug. 1990, Issue 2 pp. 1–106.

*Primary Examiner*—James L. Dwyer
*Assistant Examiner*—Scott L. Weaver

[57] ABSTRACT

An automatic call distributor (10A) with a multiport switch (12) which selectively interconnects agent telephonic units (18) of an internal telephonic network with an external telephonic unit (22) of an external telephonic network (24) and having at least one conference telephonic unit 20 interconnected with a port of the switch, an emergency key (40) on the agent unit (18) for requesting the ACD (10A) to automatically outdial and establish a two way voice path connection between another internal telephonic unit (20) and the requesting agent unit (18) to create a conference call. A memory (14) automatically stores information concerning conference calls.

37 Claims, 10 Drawing Sheets

Fig.5A

IMP DIDTR/ZZZZ

IMFORMATION GROUP: (1 - MAX) [***]
LINE PROTOCOL: [**]
SIGNALING TYPE: (EC OR ES) [**]
TRUNK FORM: (TER, TT1, SAT, OR ST1, OPTIONAL) [***]

ENTER [*]

Fig.5B

| LINE PROTOCOL PARAMETERS | A | B | C | D | E |
|---|---|---|---|---|---|
| 1 | IN | IMMED | DP | N/A | N/A |
| 2 | IN | IMMED | DTMF | N/A | N/A |
| 3 | IN | IMMED | MF | N/A | N/A |
| 4 | IN | DELAY | DP | N/A | N/A |
| 5 | IN | DELAY | DTMF | N/A | N/A |
| 6 | IN | DELAY | MF | N/A | N/A |
| 7 | IN | WINK | DP | N/A | N/A |
| 8 | IN | WINK | DTMF | N/A | N/A |
| 9 | IN | WINK | MF | N/A | N/A |
| 10 | IN | SEIZE | DP | N/A | N/A |
| 11 | IN | SEIZE | DTMF | N/A | N/A |
| 12 | ----- RESERVED FOR FUTURE USE ----- | | | | |
| 13 | OUT | N/A | N/A | IMMED | NONE |
| 14 | OUT | N/A | N/A | IMMED | DP |
| 15 | OUT | N/A | N/A | IMMED | DTMF |
| 16 | OUT | N/A | N/A | DELAY | DP |
| 17 | OUT | N/A | N/A | DELAY | DTMF |
| 18 | OUT | N/A | N/A | DELAY | MF |
| 19 | OUT | N/A | N/A | WINK | DP |
| 20 | OUT | N/A | N/A | WINK | DTMF |
| 21 | OUT | N/A | N/A | WINK | MF |
| 22 | OUT | N/A | N/A | SEIZE | DP |
| 23 | OUT | N/A | N/A | SEIZE | DTMF |
| 24 | OUT | N/A | N/A | SEIZE | MF |
| 25 | ----- RESERVED FOR FUTURE USE ----- | | | | |
| 26 | COMBO | IMMED | DP | IMMED | DP |
| 27 | COMBO | IMMED | DP | SEIZE | DP |
| 28 | ----- RESERVED FOR FUTURE USE ----- | | | | |
| 29 | COMBO | IMMED | DTMF | IMMED | DTMF |
| 30 | COMBO | IMMED | DTMF | DELAY | DTMF |
| 31 | COMBO | IMMED | DTMF | WINK | DTMF |
| 32 | ----- RESERVED FOR FUTURE USE ----- | | | | |
| 33 | COMBO | IMMED | DP | IMMED | DTMF |
| 34 | COMBO | IMMED | DTMF | IMMED | DP |
| 35 | COMBO | IMMED | DP | DELAY | DTMF |
| 36 | COMBO | IMMED | DTMF | DELAY | DP |
| 37 | COMBO | IMMED | DP | WINK | DTMF |
| 38 | ----- RESERVED FOR FUTURE USE ----- | | | | |
| 39 | COMBO | DELAY | DP | DELAY | DP |
| 40 | COMBO | DELAY | DP | DELAY | DTMF |
| 41 | COMBO | DELAY | DTMF | DELAY | DTMF |
| 42 | COMBO | DELAY | MF | DELAY | MF |
| 43 | ----- RESERVED FOR FUTURE USE ----- | | | | |
| 44 | COMBO | WINK | DP | WINK | DP |
| 45 | COMBO | WINK | DP | WINK | DTMF |
| 46 | COMBO | WINK | DTMF | WINK | DTMF |
| 47 | COMBO | WINK | MF | WINK | MF |
| 48 | ----- RESERVED FOR FUTURE USE ----- | | | | |
| 49 | COMBO | SEIZE | DP | IMMED | DP |
| 50 | COMBO | SEIZE | DTMF | IMMED | DTMF |
| 51 | COMBO | SEIZE | DTMF | IMMED | DP |
| 52 MASTER | COMBO | WINK | DTMF | DELAY | DTMF |
| 53 SLAVE | COMBO | DELAY | DTMF | WINK | DTMF |
| 54 MASTER | COMBO | WINK | DP | DELAY | DP |
| 55 SLAVE | COMBO | DELAY | DP | WINK | DP |

A = DIRECTION OF SEIZE:
   IN = INCOMING ONLY
   OUT = OUTGOING ONLY
   COMBO = BOTH INCOMING & OUTGOING

B = INCOMING ANSWERBACK PROCEDURE:
   IMMED = IMMEDIATE START
   WINK = WINK START
   SEIZE = RETURN SEIZE
   DELAY = DELAY START

C = TYPE OF INCOMING ADDRESS SIGNALING:
   DP = DIAL PULSE
   DTMF = DTMF TONES
   MF = MF TONES

D = EXPECTED START DIAL SIGNAL: (OUTGOING ANSWERBACK PROCEDURE)
   IMMED = IMMEDIATE START
   WINK = WINK START
   SEIZE = RETURN SEIZE
   DELAY = DELAY START

E = TYPE OF OUTGOING ADDRESS SIGNALING:
   DP = DIAL PULSE
   DTMF = DTMF TONES
   MF = MF TONES
   NONE = NO ADDRESS SIGNALING ON TRUNK

N/A = NOT APPLICABLE

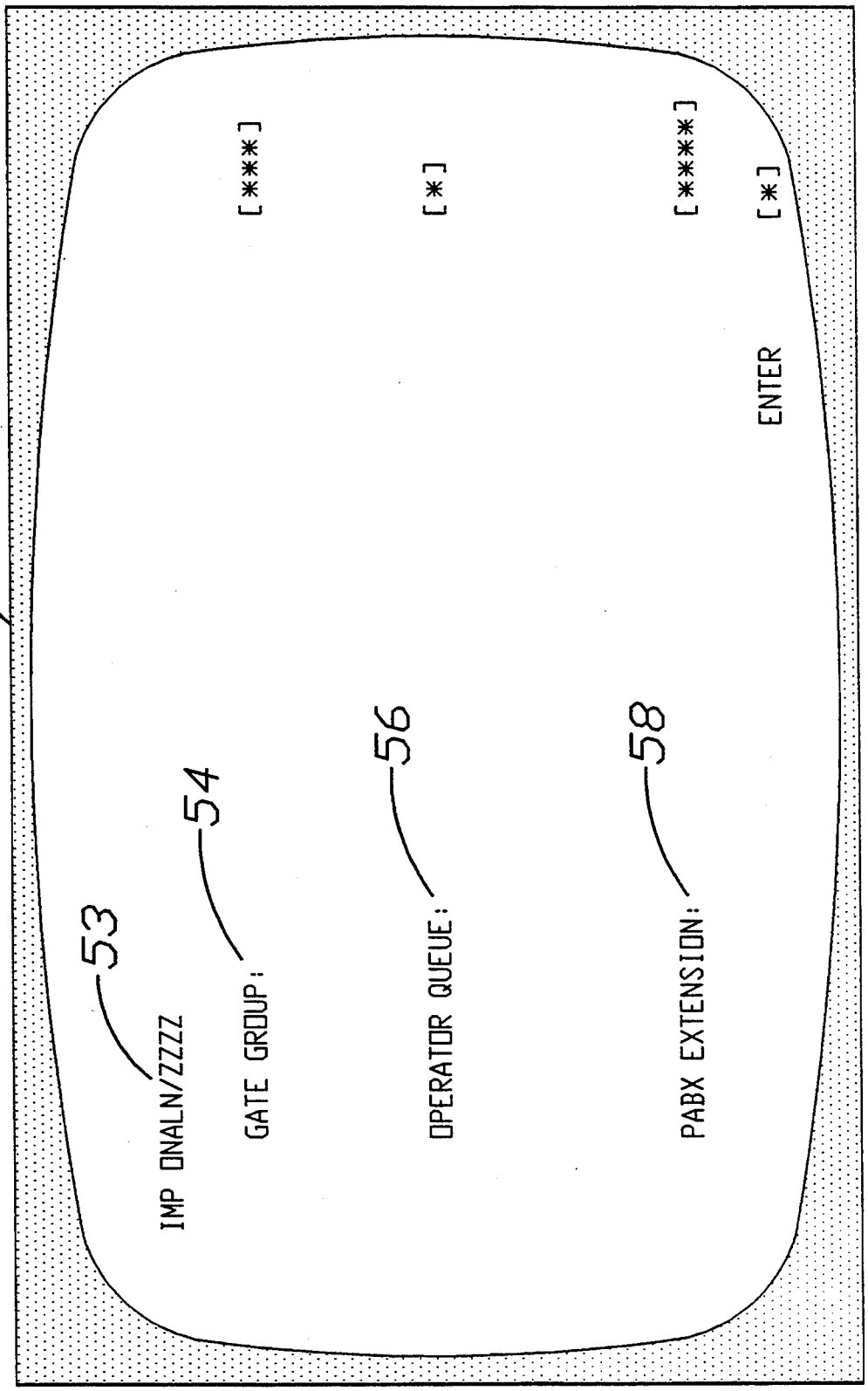

Fig. 6

| WORD \ BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | :CM CHKPT FLAGS:STBY: | | | | CLASS OF SERVICE | | | | | | TERMINATION TYPE | | | | | |
| 2 | INFORMATION GROUP NUMBER | | | | | | | | | | LINE PROTOCOL NUMBER | | | | | |
| 3 | TRUNK USAGE | | | :TKGP EXP.: | | | | | TRUNK GROUP NUMBER | | | | | | | |
| 4 | CITY OF ORIGIN ID – OR – DEDICATED PABX PORT ID – OR – OPER QUEUE NUMBER | | | | | | | | | | | | | | | |
| 5 | | | | | | | | | :TRK FORM : TOP:FLSH: SIGNALING TYPE | | | | | | | |
| 6 | | | | | | | :OVC: | | | | PRIMARY GATE NUMBER | | | | | |
| 7 | | | | | | | | | | | | | | | | |
| 8 | TERMINATION CALL COUNT | | | | | | | | | | | | | | | |
| 9 | CURRENT SIGNALING STATE | | | | | | | | :LTOF: | | CURRENT PROCESSING STATE | | | | | |
| 10 | :NLOG: PORT ID OF PARITY B – OR – TRUNK IDLE CHAIN HEAD POINTER | | | | | | | | | | | | | | | |
| 11 | TRUNK IDLE CHAIN TAIL POINTER | | | | | | | | | | | | | | | |
| 12 | DIGIT BIN ADDRESS – OR – GATE/ATTN QUEUE INFORMATION | | | | | | | | | | | | | | | |
| 13 | | | | | | | | | :I/GC: DCI:ECHO CTRL: TRUNK FAIL COUNT | | | | | | | |
| 14 | | | | | | | | | | | | | | | | |
| 15 | :CDP: MFD: | | | : | | | PORT ID OF TONE COLLECTOR OR PULSE COUNT | | | | | | | | | |
| 16 | TIME OF LAST EVENT | | | | | | | | | | | | | | | |

60

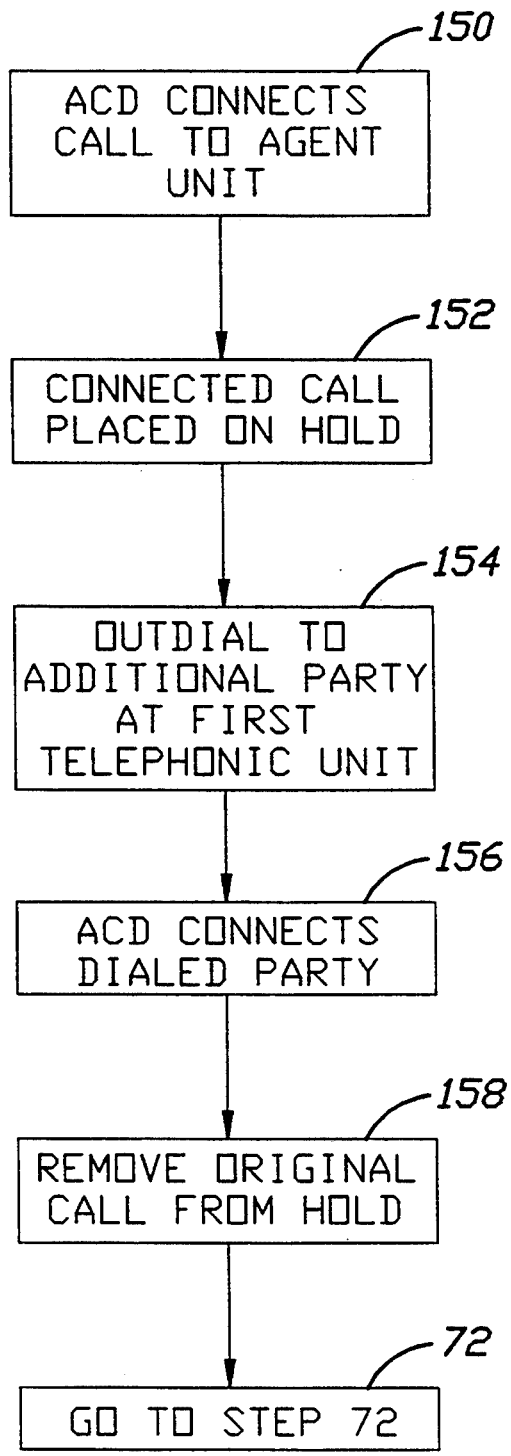

AUTOMATIC CALL DISTRIBUTION SYSTEM WITH EMERGENCY CONFERENCING AND METHOD

BACKGROUND OF THE INVENTION

1. Field of the Invention

This invention relates generally to the field of automatic telephone call distributors and, more particularly, to an automatic call distributor system having the capability of connecting an additional party to an existing connected telephone call between two parties to create a conference call.

2. Description of the Related Art Including Information Disclosed Under 37 C.F.R. 51.97-1.99

Automatic call distributors employing a multiport switch controlled by a central processing unit for selectively interconnecting a plurality of agent telephonic units of an internal telephonic network of the call distributor with external telephonic units of an external telephonic network are well known. Examples of such call distributor systems are shown in patent applications U.S. Pat. No. 5,268,903 of Jones et al. entitled "Multichannel Telephonic Switching Network With Different Signaling Formats and Connect/PBX Treatment Selectable For Each Channel" filed Oct. 2, 1991; U.S. Pat. No. 5,140,611 of Jones et al. entitled "Pulse Modulated Self-Clocking and Self-Synchronizing Data Transmission and Method for a Telephonic Communication Switching System" issued Aug. 18 1992; U.S. Pay. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System" issued Dec. 2, 1986. Known automatic call distributors receive telephonic calls from external telephonic units via an external telephonic network. These received calls are routed to agents at agent telephonic units for the agents to service the calls.

It is also known in such call distributors to have a system capable of creating a conference call between more than two parties. Disadvantageously, in these known systems the connecting of an additional party to an existing call between a caller at an external telephonic unit and an agent at an agent telephonic unit requires putting the caller at the external telephonic unit on hold. Placing a party on hold in the known systems is needed to alert the multiport switch that the agent at the agent telephonic unit is requesting the addition of another party. The agent outdials the number of the gate or the individual telephonic set to obtain a voice path connection. Since the originally connected party is placed on hold, the switch reads the DTMF (dual tone multiple frequency) digits which the agent sends to the switch by actuating the numbered 0-9 telephone keys at the agent set when outdialing for an additional party. If the original party connected at the agent set is not placed on hold, then the switch will not read the DTMF digits. Once connection is made with the additional party, the agent takes the originally connected party off hold and the conference call is created.

For example, a customer service representative at an agent telephonic unit may need to use a translator when servicing a customer call from outside the country. In known systems, the agent would have to place the customer on hold while attempting to obtain the language translator. The customer has to wait throughout the period that the agent outdials to the translator, the outdialed call is connected between the agent and the translator and the agent connects back with the customer to establish a conference call. Frequently, the customer becomes bored or annoyed at having to wait for the agent and the third party translator to be reconnected on the telephone line. Furthermore, the customer who does not speak the language of the agent may become confused when he or she is put on hold. Placing a connected party on hold when attempting to create a conference call with a third party is also troublesome in many other applications such as in the verification of collect calls by a telephone operator.

Moreover, the known systems do not provide means to create a four party conference call between four telephonic units without the necessity of placing each of the outdialed parties within the call distribution system on hold.

Another disadvantage with the known call distribution systems is that they do not have means for storing information concerning a conference call automatically outdialed from a call distributor in response to an agent unit request in which an existing call at the agent unit is not placed on hold. These known systems do not provide the advantage of printing at a paper printer the automatically outdialed conference call information concerning which agent made the request, which conferencing telephonic unit was outdialed by the automatic call distributor for connection with the agent unit or whether any conferencing telephonic unit was available for interconnection with the agent telephonic unit.

SUMMARY OF THE INVENTION

It is therefore the principal object of the present invention to provide an automatic call distribution system with an emergency conference calling system and a method which overcomes the above disadvantages of known systems by causing an automatic call distributor to join to an existing voice path connection between an agent telephonic unit and one of the external telephonic units, another selected internal telephonic unit while uninterruptedly maintaining the voice path connection with the external telephonic unit to create a conference call between the agent telephonic unit, the external telephonic unit and the other internal telephonic unit without the need for putting the external unit on hold.

This object is achieved by provision of an automatic call distribution system with an automatic call distributor having a multiport switch controlled by a central processing unit for selectively interconnecting calls from external telephonic units of an external telephonic network with internal telephonic units including agent telephonic units of the call distribution system having an emergency conference calling system means associated with at least one of the agent telephonic units having a voice path connection with one of the external units for requesting the voice path connection to be joined with another internal telephonic unit and means responsive to the requesting means for causing the automatic call distributor to join the other internal telephonic unit into the voice path connection between the requesting agent telephonic unit and the external telephonic unit while uninterruptedly maintaining the voice path connection to create a conference call between the agent telephonic unit, the external telephonic unit and the other internal telephonic unit.

Also, the object of the invention is obtained by providing an automatic call distribution system with an automatic call distributor having a multiport switch for selectively interconnecting calls from a plurality of external telephonic units of an external telephonic network with a plurality of internal telephonic units including agent telephonic units of the call distribution system having an emergency conference call system with a plurality of conferencing telephonic units for receipt of a voice connection through the multiport switch to an existing call between one of the plurality of external telephonic units and one of the plurality of agent telephonic units, means associated with the automatic call distributor for selectively interconnecting, when not in use, available ones of the plurality of conferencing telephonic units upon request from the agent telephonic unit to create a conference call between the one agent unit, the external telephonic unit and the conferencing telephonic unit and means for storing information concerning the conference call in response to the conference call request by the agent telephonic unit.

Obtainment of the object of the invention is achieved by provision of an automatic call distribution system with an automatic call distributor having a multiport switch controlled by a central processing unit for selectively interconnecting calls from external telephonic units of an external telephonic network with internal telephonic units including agent telephonic units of the call distribution system with a method of establishing a conference call having the steps of (1) requesting at one of the agent telephonic units joinder of another internal telephonic unit into a voice path connection between the requesting agent telephonic unit and one of the external telephonic units and (2) causing the automatic call distributor to join the other interior telephonic unit to join the voice path between the requesting agent telephonic unit and the external telephonic units while uninterruptedly maintaining the voice path connection with the external telephonic unit to create a conference call between the agent telephonic unit, the external telephonic unit and the other internal telephonic unit.

Moreover, the object of the present invention is achieved by providing an automatic call distribution system with an automatic call distributor having a multiport switch for selectively interconnecting calls from external telephonic units of an external telephonic network with internal telephonic units including agent telephonic units of the call distribution system, having the method of establishing a conference call comprising the steps of (1) initiating the automatic call distributor to selectively interconnect a voice path between one of the plurality of agent telephonic units and another internal telephonic unit to create a conference call between the agent telephonic unit, the external telephonic unit and the other internal telephonic unit and (2) storing information concerning the conference call in response to the initiation of the automatic call distributor selectively interconnecting the voice path.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 5A illustrates an example of the information provided on a display screen of the master console CRT of the automatic call distributor of FIG. 1 when a terminating trunk port is being added to the automatic call distributor;

FIG. 5B is a line protocol parameter table illustrating the communication parameters for a terminating trunk port;

FIG. 5C illustrates an example of the information provided on a display screen of the master console CRT of the automatic call distributor of FIG. 1 for routing a call when adding an incoming trunk port;

FIG. 6 illustrates a port termination table format for a trunk port of the multiport switch of FIG. 1;

FIG. 7C is a flow chart of the preferred steps of initiating a conference call between four telephonic unit at the automatic call distributor of FIG. 1.

DESCRIPTION OF THE PREFERRED EMBODIMENT

Figure 1:
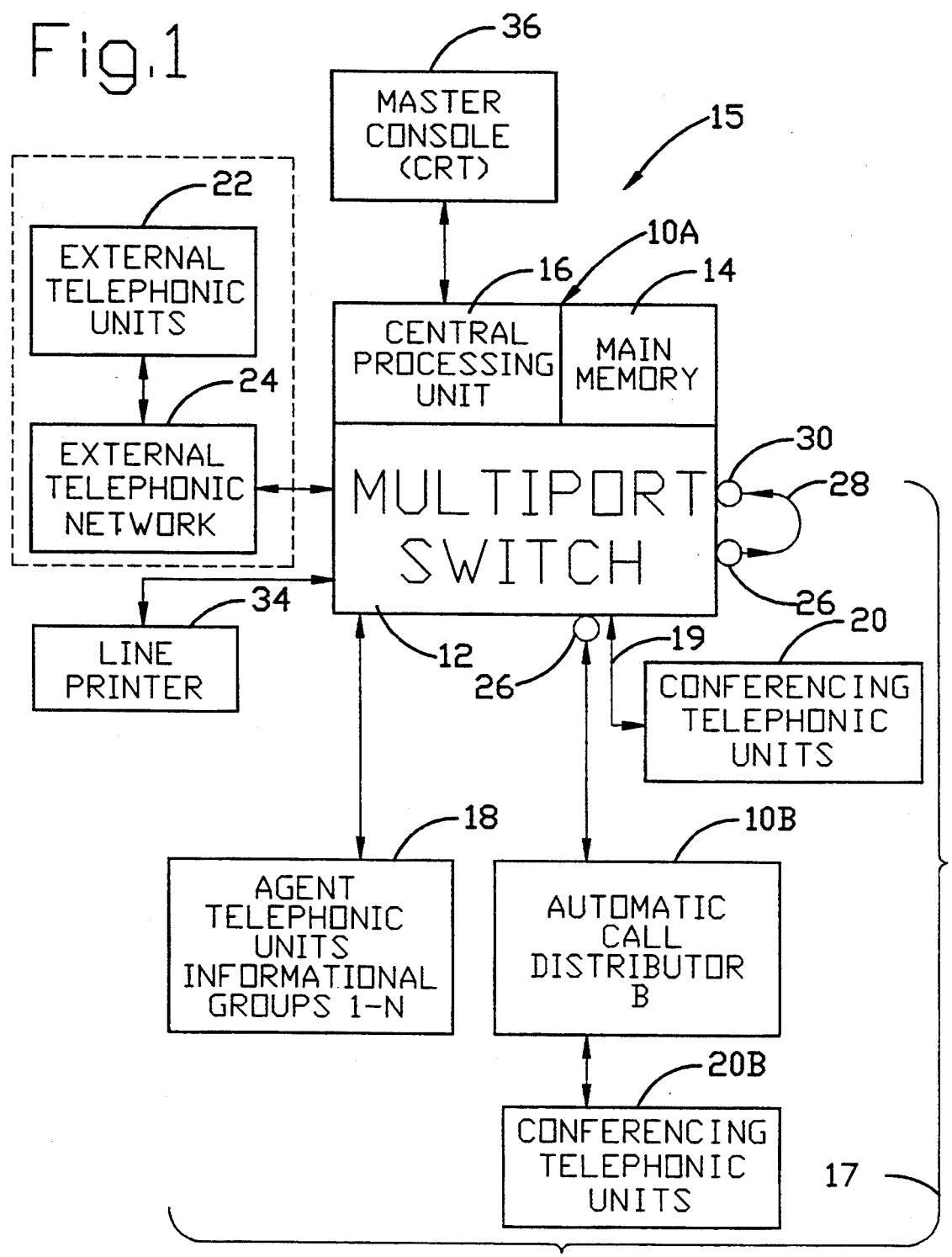
FIG. 1 is a functional block diagram of the preferred embodiment illustrating the automatic call distributor with the agent telephonic units and conference telephonic units interconnected with a known external network of external telephonic units.

Referring to FIG. 1, the automatic call distribution system 15 having an automatic call distributor 10A having a multiport switch 12 which is controlled by a central processing unit 16 operates in conjunction with a main memory 14 for selectively interconnecting a plurality of agent telephonic units 18 of an internal telephonic network with a plurality of external telephonic units 22 of an external telephonic network 24. The internal telephonic network is composed of the automatic call distributor 10A and the plurality of agent telephonic units 18 and a plurality of other internal conferencing telephonic units 20. The automatic call distributor 10A is also connected to a line printer 34, a master console 36 and one or more other automatic call distributors 10B.

The central processing unit 16 of the preferred embodiment is preferably a DEC PDP 11/34, 11/44, 11/84 or 11/94 manufactured by the Digital Equipment Corporation or the like. The switch 12 in the preferred embodiment has more than 3000 voice communication I/O ports for connection to the agent telephonic units 18, the other automatic call distributors 10B, the conferencing telephonic units 20 and to emergency recorders, voice response units and other devices, not shown.

In accordance with the present invention, the automatic call distribution system 15 also includes an emergency conference calling system 17 which includes the automatic call distributor 10A interconnected with agent telephonic units 18, other automatic call distributors 10B and other internal telephonic units or conferencing telephonic units 20. Generally, while the emergency conference calling system 17 can be implemented in numerous types and sizes of call distributors, it is preferably employed in a call distributor of the type shown in U.S. Pat. No. 5,268,903 of Jones et al. entitled "Multichannel Telephonic Switching Network With Different Signalling Formats and Connect PB Treatment Selectable For Each Channel" filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method" issued Jun. 30, 1992 and U.S. Pat. No. 4,627,047 of Pitroda et al. entitled "Integrated Voice and Data Telecommunications Switching System" issued Dec. 2, 1986.

The automatic call distributor (ACD) 10A connects calls from the external telephonic units 22 to selected agents stationed at agent telephonic units 18. In situations where the agent requires assistance from an additional party in servicing a connected call, the agent requests a conference call by actuating an emergency key 40, FIG. 3, on the agent unit 18. In response to the agent actuating the emergency key 40, the automatic call distributor 10A creates a telephonic conference call between the calling party at an external telephonic unit 22, the agent at the agent unit 18 and a selected additional party at another internal telephonic unit 20 while maintaining uninterrupted maintenance of the voice path connection between the agent telephonic unit and external telephonic unit 22. The other internal or conferencing telephonic unit 20 preferably comprises any telephonic unit other than the agent telephonic unit 18 which requested the conference call. A selected conferencing unit 20 is the telephonic unit selected by the ACD 10A for connection with the requesting agent unit 18 to establish the conference call. The conferencing telephonic units 20 are located at the same automatic call distributor 10A as the requesting agent telephonic unit 18, while other conferencing telephonic units 20B are at an automatic call distributor 10B other than the one connected with the agent unit 18 requesting the conference call.

In the preferred embodiment, a conference call is established by the ACD 10A reading an informational group number 1-N assigned to the agent unit 18 requesting the addition of another party at a conferencing unit 20 to the existing connected call at the agent unit 18. The ACD 10A selects a terminating trunk port 26 having a informational group number corresponding to that of the requesting agent unit 18. Once a terminating, outgoing trunk port 26 is selected, the trunk connected with this outgoing trunk port 26 is seized. Seizing is achieved by means of a signal is sent to the ACD 10A to indicate the trunk associated with the selected terminating trunk port 26 is busy in order to prevent any other agent units or devices from obtaining access to the trunk.

A loop around trunk 28 is used for connection to an additional party located at the same automatic call distributor 10A as the agent unit requesting the conference call. As seen in FIG. 1, the terminating trunk port 26 is connected to one end of a loop around trunk 28, and the other end is connected to an incoming trunk port 30 of the multiport switch 12. A loop around trunk 28, as used in the preferred embodiment, is a trunk which has both of its ends connected with two different ports of the same multiport switch 12.

Figure 3:
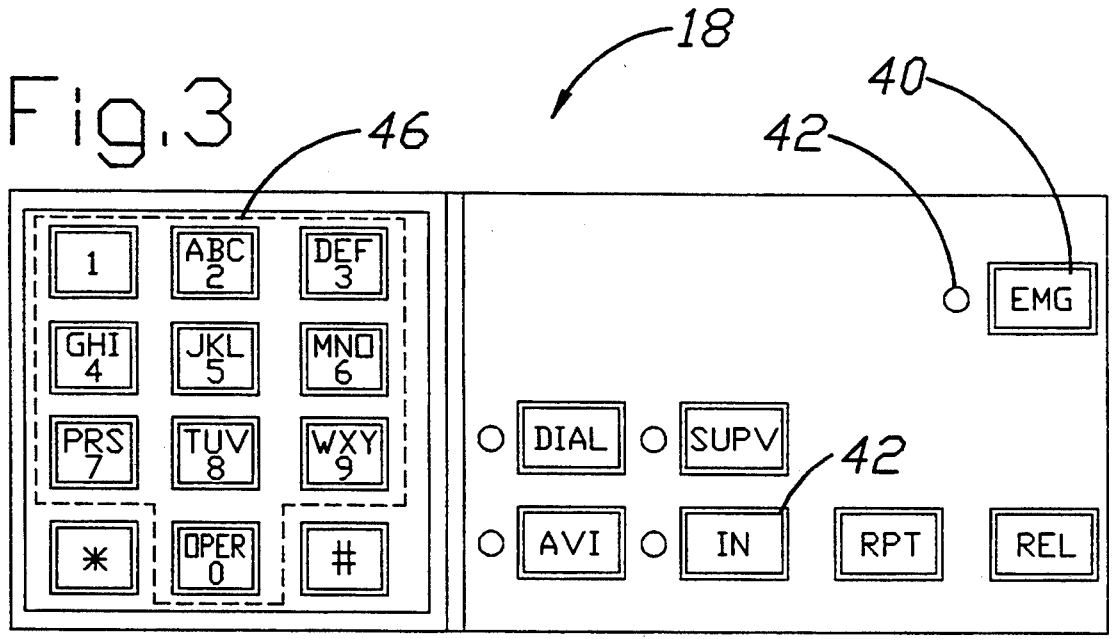
FIG. 3 is a simplified plan view of an agent telephonic unit of the internal telephonic network of the automatic call distributor of FIG. 1.

In response to the selection of the terminating trunk port 26, upon actuation of the emergency key 40, FIG. 3, the outgoing end of the loop around trunk 28, FIG. 1, connected to the terminating trunk port 26 goes off hook, and thus the incoming end of the loop around trunk 28 connected to the incoming trunk port 30 also goes off hook. The switch 12 responds to the off hook state of the incoming trunk port 30 in the same manner as if the switch were receiving an incoming call from the external telephonic network 24. The switch 12 recognizes that the outgoing end of the loop around trunk 28 is in an off hook state and connects to another party at another or conferencing telephonic unit 20 located at the same ACD 10A as the requesting agent unit 18. A two way voice path is established between the other or third party at the conferencing telephonic unit 20 and the existing telephonic call at the agent unit 18.

In response to the incoming trunk port 30 going off hook, an outdial or conference protocol associated with this port 30 is initiated and directs the ACD 10A where to connect or terminate with the trunk 28. The assigned outdial protocol specifies the processes to be performed. The protocol directs the switch 12 to route the call to a gate 19 in which the ACD 10A selects from a pool of third parties at conferencing telephonic units 20 or to a specific individual located at a specially designated conferencing unit. The switch 12 alternatively directs an existing call to terminate at another switch of another automatic call distributor 10B.

If the existing call at the requesting unit 18 is routed to another automatic call distributor (ACD) 10B, then a loop around trunk 28 is not needed. The switch 12 selects a terminating trunk port 26 and directs the existing call to terminate at a different ACD 10B. The other automatic call distributor 10B then routes the call to another internal or conferencing telephonic unit 20B at the other ACD 10B. A two way voice path between the requesting agent unit 18 and the conferencing unit 20B is created to establish the conference call.

The outdial or conference protocols are stored in the main memory 14 of the ACD 10A and are selectively programmable to direct and connect existing calls with an additional party at a conferencing telephonic unit 20. Distributing an existing call to a gate 19 is preferably done in situations in which general information (i.e. billing information) is needed by the agent for assistance. This allows the agent at the agent unit 18 to be connected to one from a large numbered pool of billing service operators at conferencing telephonic units 20 at which each general billing information is available. Calls connected from the requesting agent unit 18 to a single conferencing telephonic unit 20 are generally connected in situations where the agent needs assistance from a very specialized service operator (e.g. a technical service representative for a specially designated product).

A four unit conference call is established in the preferred embodiment by the ACD 10A routing and connecting a received call from an external telephonic unit 22 to an agent telephonic unit 18. The agent at the agent telephonic unit 18 places the received call on hold by actuating the IN key 44, FIG. 3, on the agent unit. The agent manually outdials another party at a different telephonic unit by actuating the numbered telephone keys 46, FIG. 3, on the agent unit 68, FIG. 1. The different telephonic unit is any telephonic unit—either an external telephonic unit 22 from the external network 24 or another internal telephonic unit 20, 20B of the call distribution system. In response to the voice path connection of the other party at the different telephonic unit, the agent actuates the IN key 44, FIG. 3, once again to remove the originally connected call at the external unit 24 from hold. The agent establishes a three unit conference call by manually outdialing to a third party while placing an existing call on hold. Creation of a four unit conference call is achieved by the agent actuating the emergency key 40, FIG. 3, on the agent unit 18, FIG. 1, for the ACD 10A to automatically outdial and connect another internal telephonic unit 20 to the existing three unit conference call at the agent unit. The ACD 10A performs the same operation to establish the voice path connection with the other internal telephonic conferencing unit 20, as described above with respect to creation of a four unit conference call between the agent unit 18, the different telephonic unit, the external telephonic unit 24 and the other internal telephonic unit 20.

The agent telephonic units 18 are arranged into informational groups 1-N. The switch 12 of the automatic call distributor 10A has a plurality of terminating trunk ports 26 organized in groups numbered 0-N, FIG. 2. The terminating trunk ports 26 are each connected to an outgoing end of a trunk line. Each of the 0-N groups of terminating trunk ports 26 includes at least one terminating port. Stored in the main memory 14 for each terminating trunk port is the port identification number of the port on the switch 12 to which a trunk is connected as well as its group identification number. Likewise, stored in the memory 14 for each of at least some and preferably all the agent telephonic units 18 is an informational group number associating the agent unit 18 with one of the 1-N informational groups. Preferably, there are a plurality of agent units 18 assigned to each informational group.

Also stored in the ACD 10A memory 14 is code respectively associating each of the 1-N informational groups of agent units 18 with the 0-N groups of terminating trunk ports 26. Advantageously, the assignment of each agent unit 18 to one of the informational groups 1-N is selectively programmable, so that the assignments can be changed without damaging the physical location or switch I/O port of the agent units 18. Likewise, the assignment of each of the plurality of terminating trunk ports 26 to one of the 0-N groups of terminating trunk ports can be selectively programmed. This enables assignments to be changed and terminating trunk port groups 0-N to be increased or decreased in size as desired, without changing the physical location of the trunks connected to the terminating trunk ports. Thus, if it is determined that a particular group of agents has a greater need to be connected with a certain party at a conference unit 20 via a trunk line, agents can be taken from one group and reassigned to another group.

Each group of terminating trunk ports 26 preferably has a plurality of ports, so that even if another agent unit of the same informational group is using a trunk connected with the one of the assigned groups of terminating trunk ports, it is likely that another one of the terminating ports 26 connected to a trunk will be available. If not, preferably an overflow, or default group of terminating trunk ports 26 is provided for connection to outgoing trunks and eventually for connection with an additional party at another internal telephonic unit 20 to the existing call between an agent at an agent unit 18 and a caller at an external telephonic unit 22. The default group of terminating trunk ports 26-0, FIG. 2, are available for connection to the existing call regardless of the informational group number of the agent telephonic unit 18, if the assigned informational group for the agent unit is not available.

Figure 2:
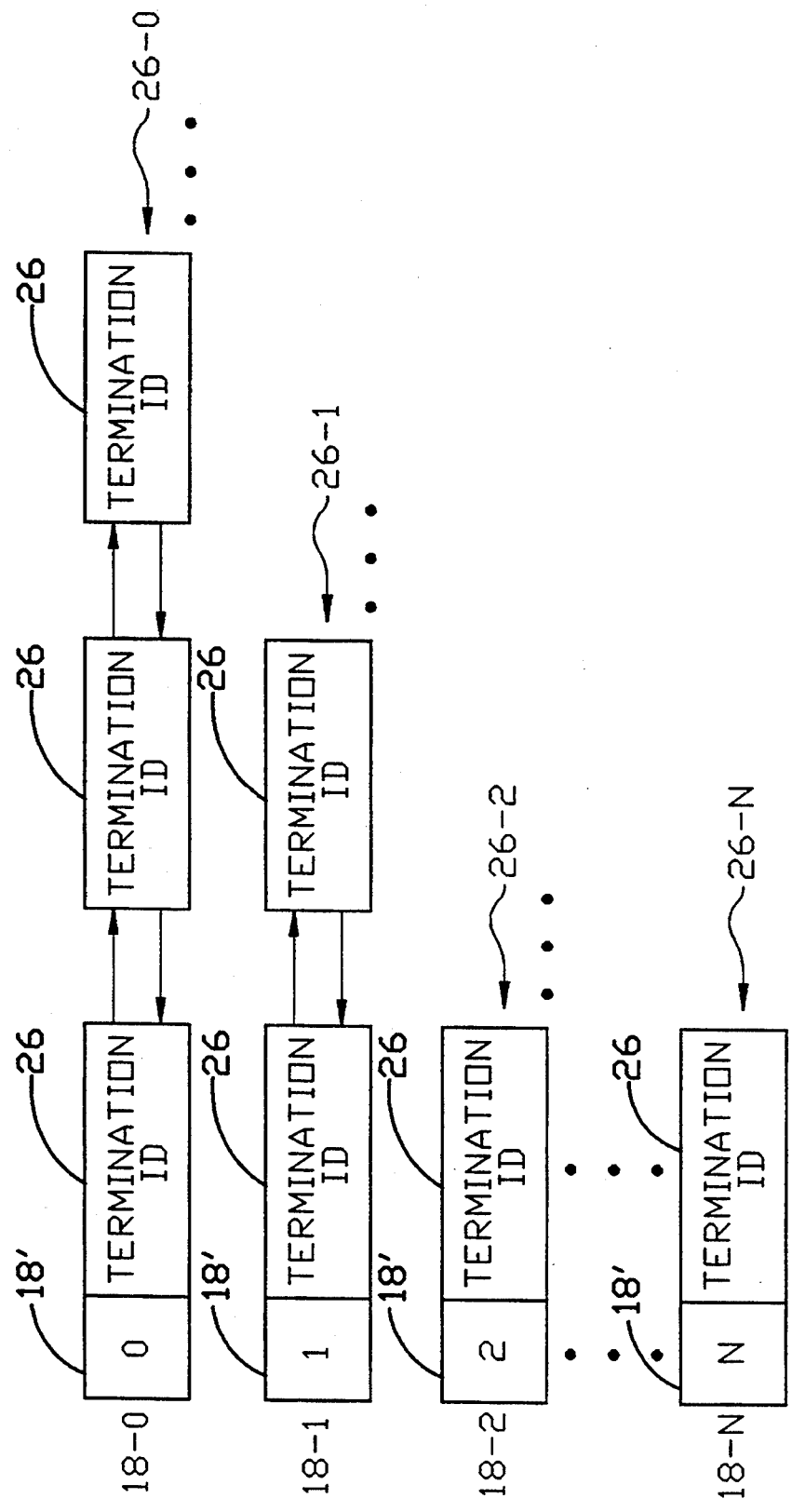
FIG. 2 is a block diagram illustrating different groups of terminating trunk ports placed in queues in association with different informational groups 0-N.

Referring also to FIG. 2, the agent telephonic units 18 are divided into 1-N informational groups which have assigned to them 1-N groups of terminating trunk ports 26-1 through 26-N, respectively. In addition, there is a default group or common pool of terminating trunk ports 26-0 which are not assigned to any of the informational groups 18-1 through 18-N of the agent units 18 but are assigned to a default group 18' which can be used by all agent units regardless of their group, in a default situation. The identification number of the informational groups 18-1 through 18-N assigned to terminating trunk port groups 26-1 through 26-N is preferably stored in the memory 14 of the automatic call distributor after assignment has been made.

As is seen in FIG. 2, the terminating trunk port 26 groups are arranged in a queue. If a trunk connected with a terminating port 26 is not in use, it is placed in a queue of available terminating trunk ports 26 for a particular preselected informational group of agent units 18. The queue is preferably a double linked list of available terminating trunk ports respectively arranged as primary and backup terminating trunk ports 26. The queue is preferably accessed on a last in, first out basis in order to provide a more uniform use of the trunks connected to the terminating trunk ports 26 in the group. If no terminating trunk ports 26 are available in the assigned group 26-1 through 26-N, FIG. 2, upon request for a conference at an agent unit 18 of a selected informational group 1-N, then an available terminating trunk port 26 from the common pool, or group 26-0, is assigned for connection via the switch 12, FIG. 1, with the requesting agent unit 18. Additionally, if the particular requesting agent unit 18 does not have an associated informational group, then a trunk at a terminating trunk port 26 from the common pool or group is selected to be connected at the agent unit upon request.

The routing and selection scheme in the ACD 10A, FIG. 1, from a requesting agent unit to a terminating trunk port 26 for eventual connection with an additional party at a conference telephonic unit 20 to an existing call is based on trunk signaling. The industry standard trunk signaling types used in the preferred embodiment are E & M (Ear and Mouth Signaling), ES (Ear and Mouth Standard), EC (Ear and Mouth Collins), G3 (Ground Start D3), GS (Ground Start D2), RD (Ring Down) and LP (Loop Start). Among the devices which use these signaling types in an automatic call distribution environment are included voice response units, trunks, digital signaling recorders, answering machines and private branch exchanges (standard telephones). The software routing and selection scheme in the Automatic Conference Calling System is the same as the one used in U.S. patent application Ser. No. 07/966,989 of Adams et al. now U.S. Pat. No. 5,392,329 entitled "Automatic Call Distribution System With Emergency Recording System and Method" filed Oct. 27, 1992. The emergency recorders in the above mentioned U.S. patent application Ser. No. 07/966,989 have been replaced by trunks at terminating trunk ports for connection of an additional party to create a conference call instead of recording existing telephonic calls.

Referring to FIG. 3, the emergency lamp 42 is lit in response to the actuation of the emergency key 40 to create a conference call with another party. The emergency lamp 42 is lit not only at the requesting agent telephonic unit 18 but also at the other internal telephonic units 20 within the call distributor network 10A which are connected to the existing call at the requesting unit to create a conference call. These conference telephonic units have their respective emergency lamps 42 lighted to indicate that the received call at the unit is a conference call. Control of lighting the emergency lamps 42 of the other connected units is achieved by means of an agent processing computer program of an event driven call processing program. This program is stored in the memory 14 and determines what other internal telephonic units 20 are connected to the call at the requesting agent telephonic unit 18. The emergency recording program initiates the lighting of the other lamps 42, FIG. 3; then, a conference call is connected between the requesting agent unit 18, FIG. 1, and the conference telephonic unit 20.

If a conference call is established, actuation of the emergency key 40 on the requesting agent telephonic unit 18 once again terminates the conference call. The requesting agent unit 18 disconnects the conferencing unit 20 in response to the actuation of the emergency key 40 at the requesting unit during operation of a conference call. Again, termination of the conference call is initiated by the agent processing software of the event driven process program located in the switch 12 memory 14 of the automatic call distributor 10, FIG. 1. In response to terminating the conference call by disconnecting the conferencing telephonic unit 20 upon actuation of the emergency key 40 at the requesting unit 18, the emergency lamp 42 on the requesting unit is turned off to indicate the conference call has ended. A signal is sent to the switch 12, FIG. 1, and the selected terminating trunk port 26 is placed back into the queue of its terminating trunk informational group 26-0 through 26-N, FIG. 2. Preferably, the terminating trunk port 26, FIG. 1, is placed at the end of the queue for the corresponding informational group to the requesting agent unit 18.

If an emergency key 40, FIG. 3, is actuated at conference telephonic unit other than the original requesting agent unit 18, the emergency lamp 42 on the conference unit is turned off; however, the voice path connection and thus the conference call between the agent telephonic units continues. Therefore, termination of the conference call is controlled by the operator or agent who initiated the recording at the requesting unit 18. A paper printer or line printer 34, FIG. 1, prints out a conference call report 50, preferably in the form shown in FIG. 4, indicating that a request for an emergency conference call is being made at the requesting unit 18.

Figure 4:
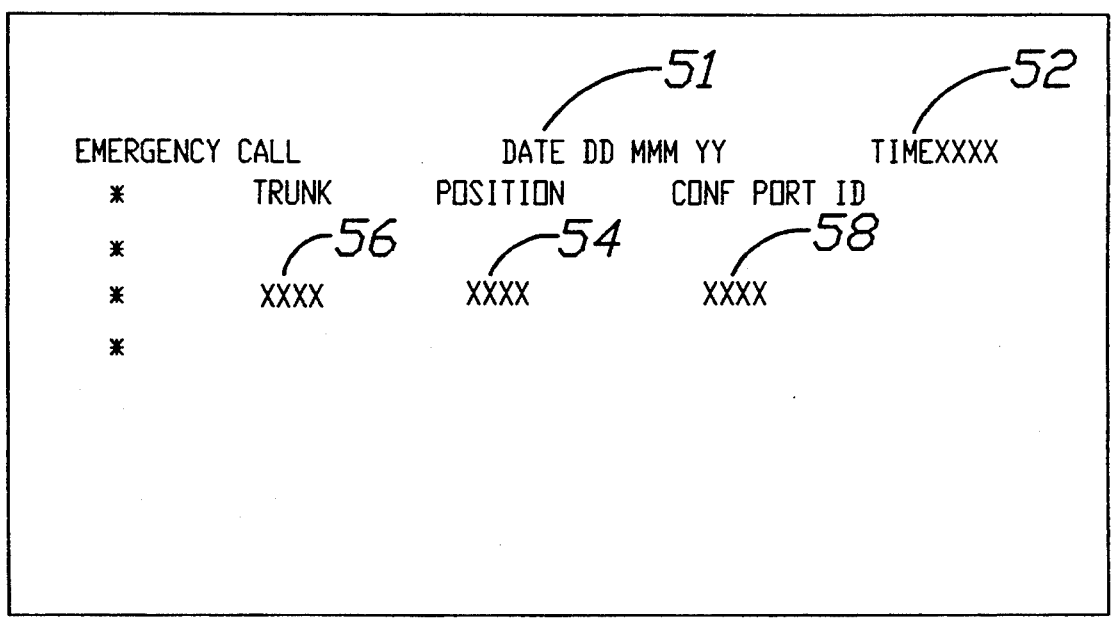
FIG. 4 is a preferred format for a line printer conference report provided by the line printer of the preferred embodiment of the automatic call distributor of FIG. 1.

As seen in FIG. 4, the conference call message or report 50 includes the time 52 when the conference call was requested at the requesting unit 18, FIG. 1, the date 51 the conference call request was made, the telephone number 54 of the requesting agent telephonic unit, the trunk or port identification number 56 of the requesting agent telephonic unit and a conference call port identification number 58 of the other internal telephonic unit 20 to which the requesting agent unit connects. If no conference telephonic unit 20 is assigned to connect with the requesting agent unit 18, even though a request for a conference call is made at the requesting unit 18, the conference call port identification number 58 is printed as zero to indicate that no other internal telephonic unit was connected to the call.

An operator or agent actuates the emergency key 40, FIG. 3, to request a conference call with another conference telephonic unit 20. Two steps are performed in the processing of the call in response to the actuation of the emergency key 40. First, an emergency indicator bit in a port termination table 60, FIG. 6, is set for the requesting agent telephonic unit 16 in the main memory 14, FIG. 1. FIG. 6 represents a port termination table 60 for a trunk port of the ACD 10A. The port termination tables 60 are stored in sections of the memory 14 associated with each port which gives the status of the switch port in the automatic call distributor 10A.

A port termination table exists in the memory 14 of the automatic call distributor 10A for each port of the multiport switch 12. The port termination table 60, FIG. 6, selectively includes termination information relating to information group number ID of an agent unit, the ID of the port connected to the agent unit, the ID of the corresponding terminating trunk port 26, etc. The port termination tables 60 for the switch ports of the preferred embodiment each contain sixteen bits per word with a sixteen or twenty-four word memory. The status of this information for the particular port changes in response to different events occurring on the port.

Next, a routine which selects a terminating trunk port 26, is scheduled for processing. After declaring an emergency conference condition is present, a conference event is detected by the agent unit processing software stored in the main memory 14. If the conference event is detected, the emergency conference indicator bit is checked in the port termination table 60 to determine if the bit is set. If the emergency indicator bit is set, the ID of the terminating trunk port 26 is stored in the port termination table 60, FIG. 6, for the requesting agent telephonic unit 18.

If the bit is not set, a disconnect signal is sent to the corresponding port termination table of the selected terminating trunk port 26. The emergency conference call processing software creates the voice path between the requesting agent telephonic unit 18 and the selected conferencing telephonic unit 20. The agent unit which is processing software then signals the conference call selection routine in the conference call processing software to check the terminating trunk port queues 26-0 through 26-N to obtain an available terminating trunk port 26. Initially, the queue for the informational group, or I-group, for the requesting agent telephonic unit 18 is checked. If there are no terminating trunk ports 26 available there, then the queue from the common pool of terminating trunk ports 26-0, FIG. 3, is checked.

If a terminating trunk port 26 is successfully obtained, the emergency conference call routine sends a select event signal to the terminating trunk port with the ID of the requesting agent unit 18, FIG. 1. When a terminating trunk port 26 is successfully connected, it sends an emergency connect event signal via the switch 12 to the requesting unit 18 with the ID of the selected terminating trunk port. The emergency lamp 42 on the requesting unit 18, FIG. 3, turns on to indicate to the agent at the requesting unit that a conference call has been connected. If no terminating trunk ports 26 are available, the conference call request is denied, and the conference call report 50, FIG. 4, is sent with a terminating trunk port ID of zero. The conference call report 40 from the paper or line printer 34, FIG. 1, then shows zeros for the terminating trunk port identification number 58, FIG. 4, to indicate that no terminating trunk port was found.

Referring now to FIG. 5A, a master console display, preferably a CRT or a personal computer, 36 is shown displaying the Add Trunk Screen 62. The master console 36, FIG. 1, is connected to the central processing unit 16 and is used to program the automatic call distributor 10A upon insertion or change of a terminating trunk port 26 parameters. In response to the command, ADD TRUNK DIDTR, for a direct inward dial trunk, being programmed into the master console 36, FIG. 1, the Add Trunk display appears on the screen 62. An operator or system administrator at the master console 36 uses the Add Trunk screen 62 to indicate to the central processing unit 16, FIG. 1, the selected terminating trunk port, the corresponding informational group ID for the port, the signaling type and defines the line protocol for the port. This information is placed in the port termination table 60, FIG. 6, of the terminating trunk port 26, FIG. 1, in the main memory 14. The ZZZZ prompt 63, FIG. 5A, of the screen 62 is used for the system administrator to insert the port ID for the terminating trunk port 26. The informational group assigned to the terminating trunk port 26 is inserted into the informational group prompt 64 and stored in the memory 14.

In the preferred embodiment, among the signaling types selectively allowed into place in queue are: E&M (Ear and Mouth signaling), ES (Ear and Mouth standard), EC (Ear and Mouth calling), G3 (Ground Start D3), GS (Ground Start D2), RD (Ring Down) and LP (Loop Start). The signaling type is inserted in the signaling type prompt 65, FIG. 5A. Among the standard trunk types used in the preferred embodiment include: direct inward dial, intertandum trunks, offnet access code trunks, tie lines, Dialed Number Identification Service Trunks and Integrated Services Digital Network. A specified trunk type is inserted in the master console 36 with the ADD TRUNK command for the add trunk screen 62 to appear at the console 36. The protocol parameters for the port are inserted at the line protocol prompt 66 of FIG. 5A and as described and shown in the table at FIG. 5B. FIG. 5B is a table illustrating the protocol parameters for a terminating trunk port 26, FIG. 1, used for communication with a conferencing telephonic unit 20. The numeric value for the line protocol parameter is inserted at the line protocol prompt 66, FIG. 5A, on the add trunk screen 62. Column A represents the direction of seize and described the type of trunk connected to the port. In column A IN=incoming trunk only; OUT=outgoing only; and COMBO=both incoming and outgoing trunk. Column B represents the incoming answerback procedure for the port 26 in which: IMMED=m immediate start; WINK=wink start; SEIZE=return seize; and DELAY=delay start. Column C represents the type of incoming address signaling in which: DP=dial pulse; DTMF=DTMF tones; MF=multiple frequency tones. Column D represents the expected start dial signal or the outgoing answerback procedure in which IMMED, WINK, SEIZE and DELAY have the same representation as in column B. Column E represents the type of outgoing address signaling with the same represented terms as column C and NONE=no address signaling on trunk and N/A=not applicable. The trunk form is also inserted into the memory 14 through the trunk form prompt 67, FIG. 5A. The standard trunk forms used in the preferred embodiment are: TER (Terrestrial), TT1 (Terrestrial T1 network), SAT (Satellite), ST1 (Satellite to a T1 line) and TAB (defaults to a Terrestrial).

Once the terminating trunk port 26, FIG. 1, is added, the incoming trunk port 30 is programmed through the master console CRT 36 to inform the ACD 10A where to direct the existing call to connect or terminate with a conferencing unit 20. FIG. 5C represents the incoming trunk port screen 52 of the master console CRT 36 of FIG. 1. The system administrator at the master console 36 enters the ONALN (off net access line) command to enter the fixed outdial protocol for programming the ACD 10A to route calls received at the incoming trunk port 30. The ZZZZ prompt 53 is used for the system administrator to insert the port ID of the incoming trunk port 30. To connect the call to a particular gate or pool of conferencing telephonic units 20, the gate identification number is inserted at the gate group prompt 54 of FIG. 5C. To terminate the call at an attendant or operator who further directs the call to a conferencing unit 20, the operator ID number is inserted at the operator queue prompt 56 of FIG. 5C. A valid extension number of a conferencing unit is entered at the conferencing unit prompt 58 and stored in the memory 14, FIG. 1, to connect the existing call directly to a particular conference telephonic unit 20. In response to a call being received at an incoming trunk port 30, the ACD 10A automatically outdials in accordance with the conference protocol to the directed gate, operator or conferencing unit for establishing a two way voice path between the agent unit and the connected conferencing unit to create the conference call.

While the advantages of the invention are preferably obtained with the automatic call distributor 10A described above with reference to FIGS. 1–6, the method of the invention can be practiced with any other automated call distributor having a multiport switch for selectively interconnecting a plurality of agent telephonic units with external telephonic units of an external telephonic network. In any event, the preferred method of practicing the invention comprises the steps of (1) requesting at one of the agent telephonic units joinder of another internal telephonic unit into a voice path connection between the requesting agent telephonic unit and one of the external telephonic units and (2) causing the automatic call distributor to join the other interior telephonic unit to join the voice path between the requesting agent telephonic unit and the external telephonic units while uninterruptedly maintaining the voice path connection with the external telephonic unit to create a conference call between the agent telephonic unit, the external telephonic unit and other internal telephonic unit.

Figure 7A:
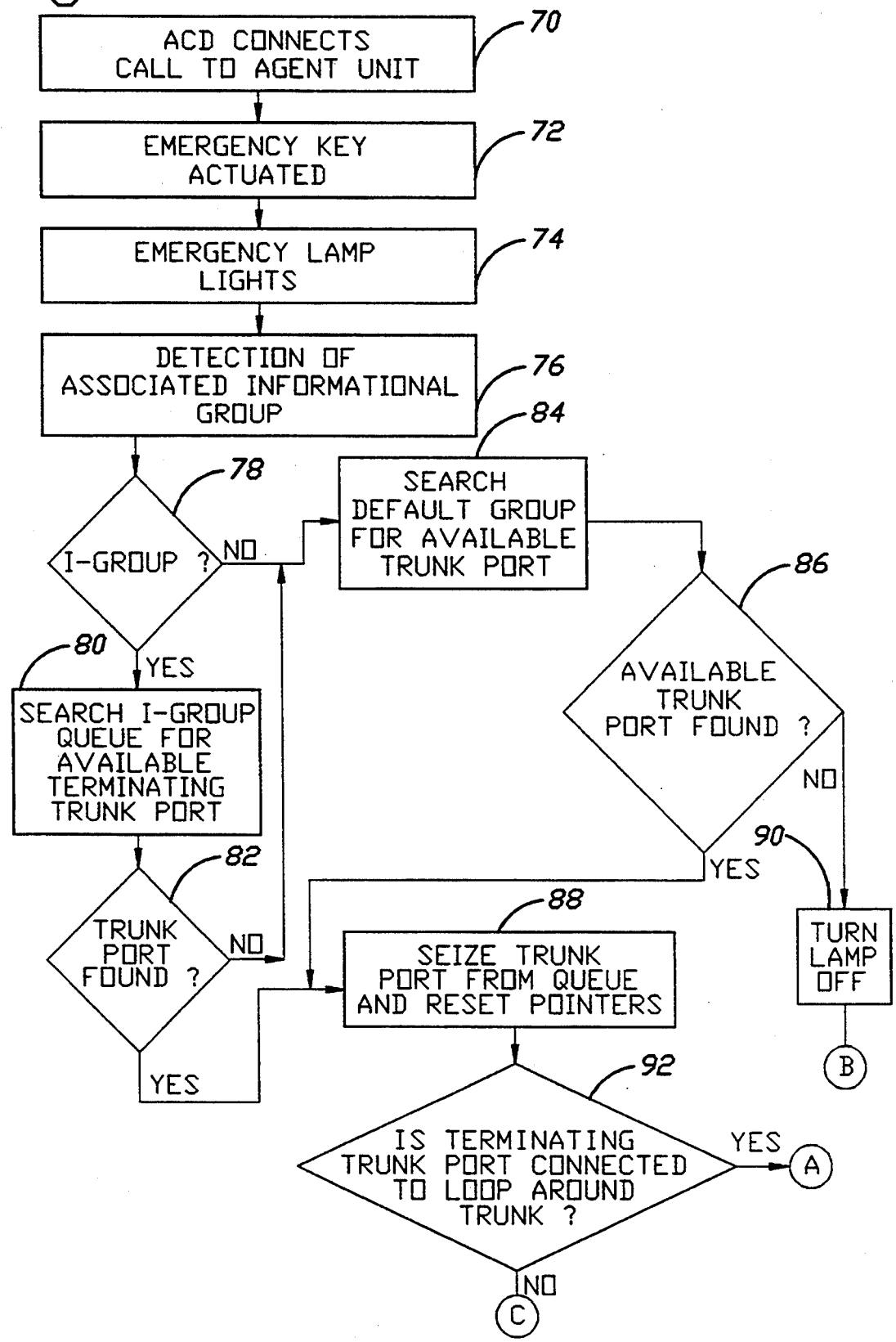
FIGS. 7A and 7B illustrate a flow chart of the preferred steps of initiating a conference call in the automatic call distributor of FIG. 1.

Referring to FIG. 7A, the method of creating an emergency conference call is done by the automatic call distributor 10A connecting a telephonic call from an external telephonic unit 22 through the external telephonic switching network 24 to one of the plurality of agent telephonic units 18 via the multiport switch 12 of the call distributor in step 70. In step 72, the agent receiving the call stationed at the agent telephonic unit 18 actuates the emergency key 40, FIG. 3, to create a conference call with an additional party at another internal telephonic unit 20, also called a conferencing telephonic unit. In response to the agent actuating the emergency key 40, the emergency lamp 42 on the console of the agent unit 18 is illuminated in step 74, FIG. 7A.

In step 76, the central processing unit 16, FIG. 1, reads the assigned informational group ID stored in memory 14 for the agent unit 18 requesting joinder of an additional party at a conferencing unit 20. In step 78, FIG. 7A, the automatic call distributor 10A, FIG. 1, determines if the requesting agent telephonic unit 18 has an associated informational group ID number. The agent telephonic units 18 are selectively organized into informational group 1-N which are associated with informational groups of the terminating trunk ports 26-0 through 26-N. The groups of terminating trunk ports 26 are placed in a queue of available and unavailable trunk ports. A terminating trunk port is available when it is not being accessed by a trunk. If the requesting agent unit 18 does not have an associated informational group ID, then in step 84, FIG. 7A, the ACD 10A searches the default group or common pool 26-0, FIG. 2, for an available terminating trunk port 26. In step 86, the ACD 10A determines if a terminating trunk port 26 from the common pool is available for connection. If no terminating trunk port 26 is found in the common pool then the emergency lamp 40, FIG. 3, is turned off in step 90, FIG. 7A, and a conference report 62, FIG. 4, is printed at the line printer 34, FIG. 1, indicating a conference call was requested but a terminating trunk port 26 was not available and connected to the requesting agent unit 18 in step 110 of FIG. 7B. If an available terminating trunk port 26 from the common pool or default group is found, then in step 88, FIG. 7A, the ACD 10A seizes the terminating trunk port 26 from the default queue and resets the pointers to the selected terminating trunk port.

If the requesting agent unit 18 has an associated informational group ID, then in step 80, FIG. 7A, the automatic call distributor 10A, FIG. 1, searches the informational group queue of terminating trunk ports 26 corresponding to the requesting unit informational group 18-1 through 18-N for an available terminating trunk port 26. The queue of terminating trunk ports is accessed in a last in, first out basis. If no terminating trunk port is available in the corresponding queue, the in step 82 the ACD 10A searches the common pool queue of terminating trunk ports in step 84. If the ACD 10A finds an available terminating trunk port 26 from the corresponding informational group queue in step 82, then the terminating trunk port 26 is seized (i.e. make the trunk connect to the port busy) from its queue and the pointers to the terminating trunk port are reset in step 88.

In step 92, the ACD 10A, FIG. 1, determines if the terminating trunk port 26 is connected to a loop around trunk 28. If the terminating trunk port 26 is not connected to a loop around trunk 28, then the switch 12 of the ACD 10A directs the call to an automatic call distributor 10B other than the one connected with the requesting unit 18 in step 94 of FIG. 7B. In step 95, FIG. 7B, the other ACD 10B, FIG. 1, directs the received call to another internal telephonic unit 20 to create a conference call with the requesting unit 18.

Figure 7B:
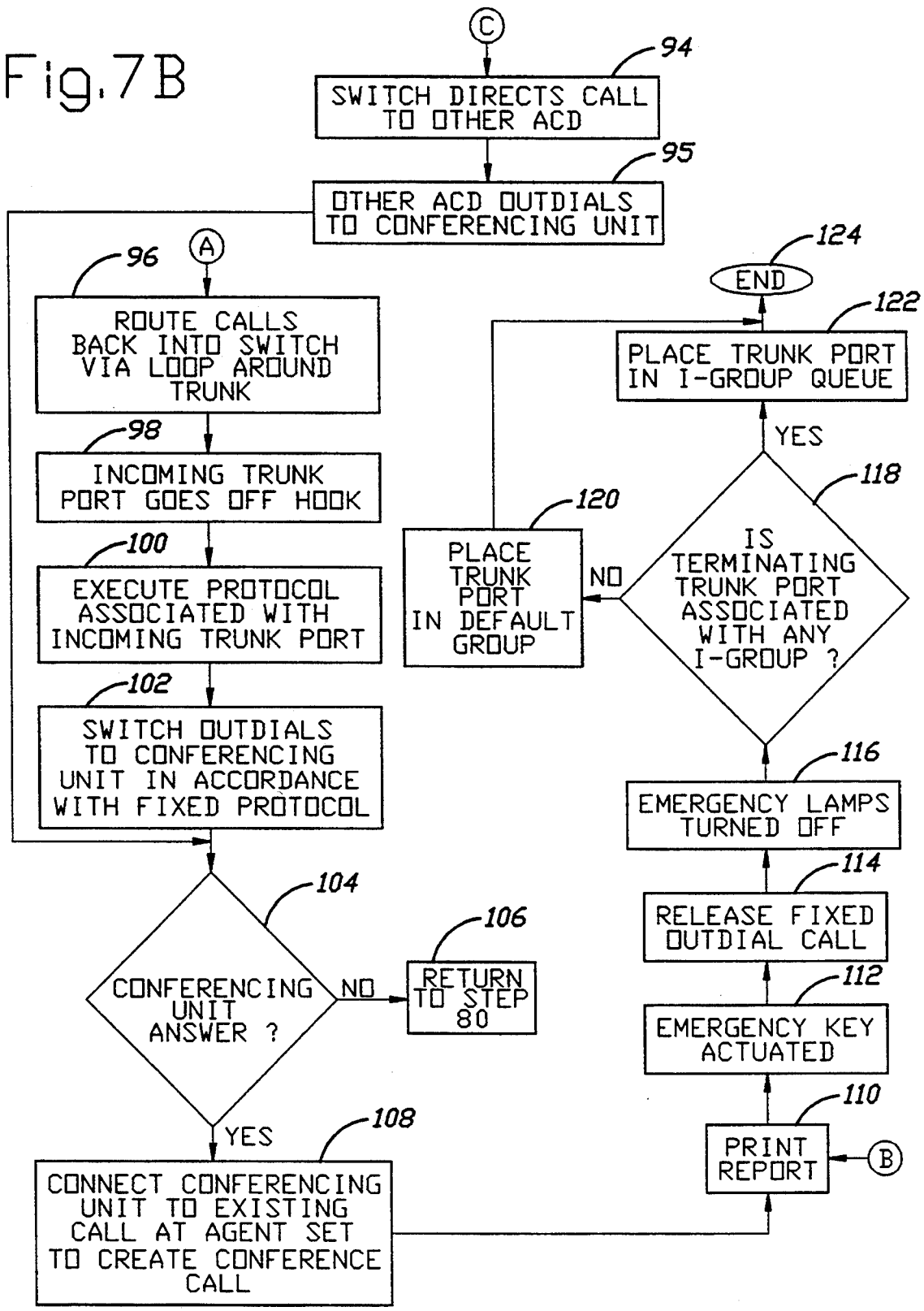

If the terminating trunk port 26 is connected to a loop around trunk 28, then in step 96, FIG. 7B, the loop around trunk carries the call back into an incoming trunk port 30 of the same ACD 10A connected to the requesting agent unit 18. In step 98, FIG. 7B, the incoming trunk port 30, FIG. 1, goes off hook and the switch 12 responds in the same manner as if it were receiving an incoming call. In step 100, FIG. 7B, an outdial protocol stored in the main memory 14, FIG. 1, and associated with the incoming trunk port 30 is executed. In accordance with the fixed outdial protocol, the switch 12 of the ACD 10A outdials to an additional party at another internal telephonic unit 20 connected with the switch to establish a conference call in step 102. In step 104 the automatic call distributor 10A determines if the additional party at the other internal telephonic unit 20 which the call is directed has answered the call by the conferencing unit going off hook. If the conferencing telephonic unit 20 does not go off hook, thus indicating that the distributed call has not been answered, then in step 106, FIG. 7B, the ACD 10A, FIG. 1, returns to step 80 to again search the informational group corresponding to the requesting agent unit 18 to find an available terminating trunk port 26. If the additional party at the conferencing unit 20 answers, then in step 108, FIG. 7B, the ACD 10A creates a two-way voice path between the requesting agent unit 18 and the additional party at the conferencing unit 20 to establish the conference call. The voice path connection or existing call between the external telephonic unit 22 and the agent telephonic unit 18 is uninterruptedly maintained during the selection and connection of the voice path between the conferencing telephonic unit 20 and the agent unit. The conference call between the external unit 22, the agent unit 18, and the conferencing unit 20 is created without the need of placing the existing call from the external telephonic unit on hold.

Once the conference call between the agent at the requesting unit 18, the caller at the external telephonic unit 22, FIG. 1, and the additional party at the conferencing unit 20 is established, the paper or line printer 34 prints a conference report 50, FIG. 4, of the conference call in step 110. In response to the automatic call distributor 10A connecting a voice path between an agent unit 18 and another internal telephonic unit 20 for establishing a conference call, the information displayed in the conference report is stored in the memory 14 of the ACD 10A. The conference report 50 includes the time 52 the conference call was made, the date 51 the conference request was made, the telephonic number 54 of the requesting unit 48, the trunk or port ID number 56 of the requesting agent unit, and the port ID number of the selected other internal telephonic unit 20.

In step 112, FIG. 7B, the agent at the requesting unit 18 actuates the emergency key 40, FIG. 3, again and the fixed outdial call to the other internal telephonic unit 20 is released to disconnect the two way voice path between the requesting agent unit and the other internal telephonic unit in step 114. The emergency lamps 42, FIG. 3, are turned off at the requesting agent unit 18 and the other internal telephonic unit 20 in step 116, FIG. 7B.

The ACD 10A, FIG. 1, determines if the selected terminating trunk port 26 is associated with any informational group in step 118. If the terminating trunk port 26 does not have a corresponding information group, then in step 120, FIG. 7B, the terminating trunk port is placed back in the queue for the default group. If the terminating trunk port 26, FIG. 1, is associated with the informational group, then in step 122, FIG. 7B, the trunk port is referred to an appropriate location in the queue for its corresponding information group, the pointers to the trunk port are updated and the execution of the conference call ends in step 124.

Referring to FIG. 7C, the preferred method of creating a four-unit conference call is shown. In step 150, the automatic call distributor 10A, FIG. 1, receives a call from an external telephonic unit 22 via the external telephonic network 24. The ACD 10A connects the received call to a selected agent telephonic unit 18 for an agent to service the call. In step 152, FIG. 7C, the agent places the connected caller at the external telephonic unit 22, FIG. 1, on hold by actuating the IN key 44, FIG. 3, on the agent unit. Once the caller is placed on hold, in step 154, FIG. 7C, the agent outdials an additional party by actuating the numbered telephone keys 46 on the agent telephonic unit 18, FIG. 6.

In step 156, the automatic call distributor 10A, FIG. 1, connects the outdialed additional party at a first telephonic unit to the agent telephonic unit 18. The first telephonic unit is any telephonic unit either external 22 or internal 20 to which the agent outdials. In step 158, the agent removes the call from the external telephonic unit from being on hold by again actuating the IN key 44, FIG. 3, to establish a three unit conference call between the agent at the agent set 18, the caller at the external telephonic unit and the additional party at the first telephonic unit.

In order to complete a four unit conference call, the agent actuates the emergency key 40, FIG. 3, as seen in step 72 of FIG. 7. The same process is followed as in steps 74–124, FIG. 7, for the ACD 10A, FIG. 1, to outdial and connect another additional party at another internal telephonic unit 20 to the existing call to establish the four unit conference call between the agent telephonic unit 18, the first telephonic unit, the external telephonic unit 22 and the other telephonic unit 20.

The computer program stored in memory 14 to insure the central processing unit 16 and used to implement the algorithm of FIGS. 7A, 7B and 7C and generally to implement the method of the invention is preferably that listed in the detailed design program document attached hereto as Appendix A.

While a detailed description of the preferred embodiment of the invention has been given, it should be appreciated that many variations can be made thereto without departing from the scope of the invention as set forth in the appended claims.

We claim:

1. In an automatic call distribution system with an automatic call distributor having a multiport switch controlled by a central processing unit for selectively interconnecting calls from external telephonic units of an external telephonic network with internal telephonic units including agent telephonic units of the call distribution system, the improvement being an emergency conference calling system, comprising:

means associated with an agent telephonic unit, having a first existing voice path connection with one of the external units, for enabling an agent to request a second voice path connection to be joined between the agent telephonic unit and a first internal telephonic unit;

a gate associated with a pool of internal telephonic units including the first internal telephonic unit and other internal telephonic units;

means for automatically selecting the first internal telephonic unit from the pool of internal telephonic units associated with the gate; and means responsive to the request enabling means for causing the automatic call distributor to join the first internal telephonic unit into the first existing voice path connection between the requesting agent telephonic unit and the one external telephonic unit including means for connecting the second voice path between the first internal telephonic unit at the gate and the agent telephonic unit requesting the second voice path connection while uninterruptedly maintaining the first existing voice path connection to create a conference call between the agent telephonic unit, the external telephonic unit and the first internal telephonic unit.

2. The automatic call distribution system of claim 1 in which the request enabling means includes a single manually actuatable emergency key attached to the agent telephonic unit for requesting the conference call between the one external telephonic unit, the agent telephonic unit and the first internal telephonic unit.

3. The automatic call distribution system of claim 2 including an emergency lamp attached to the agent telephonic unit, and means for lighting the emergency lamp in response to actuation of the emergency key to request the conference call.

4. The automatic call distribution system of claim 3 including means responsive to actuation of the single emergency key of the agent telephonic unit when the conference call is in progress for disconnecting the second voice path connection between the agent telephonic unit and the first internal telephonic unit.

5. The automatic call distribution system of claim 4 including means for turning off the emergency lamp in response to the disconnection of the second voice path between the agent telephonic unit and the first internal telephonic unit.

6. The automatic call distribution system of claim 3 including another emergency key with another emergency lamp on the first internal telephonic unit, and means for lighting the other emergency lamp in response to the connection of the second voice path between the agent telephonic unit and the first internal telephonic unit.

7. The automatic call distribution system of claim 6 including means responsive to an actuation of the other emergency key of the other internal telephonic unit for turning off the other emergency lamp despite continuation of the voice path connected between the agent telephonic unit and the other internal telephonic unit.

8. The automatic call distribution system of claim 1 including means associated with the agent telephonic unit for placing the one external telephonic unit on hold, means associated with the agent telephonic unit for outdialing a different telephonic unit to establish a different voice path connection between the different telephonic unit and the agent telephonic unit, means associated with the agent telephonic unit for removing the one external telephonic unit from being on hold to establish a three unit conference call between the agent telephonic unit, the different telephonic unit and the one external telephonic unit, and in which the causing means includes means for connecting the first internal telephonic unit to the agent telephonic unit to establish a four unit conference call between the agent telephonic unit, the different telephonic unit, the first internal telephonic unit and the one external telephonic unit.

9. The automatic call distribution system of claim 1 in which the voice path connection causing means responsive to the request enabling means includes means for organizing the plurality of agent telephonic units into informational groups, a plurality of terminating trunk ports connected to the multiport switch, means for organizing the plurality of terminating trunk ports of the multiport switch into informational groups corresponding to the agent telephonic unit informational groups, and means for selectively connecting the second voice path connection between one of the plurality of terminating trunk ports of one informational group to the agent telephonic unit requesting the second voice path connection of the corresponding informational group in response to the request for the second voice path connection.

10. The automatic call distribution system of claim 9 including means for placing at least one of the informational groups of terminating trunk ports corresponding to at least one of the informational group of agent telephonic units, when the at least one informational group of terminating trunk ports is not in use, in a queue of available terminating trunk ports.

11. The automatic call distribution system of claim 10 in which the selectively connecting means includes means for accessing the queue on a last in, first out basis.

12. The automatic call distribution system of claim 9 including a common pool of terminating trunk ports which are unassigned to the informational groups of agent telephonic units, and means responsive to a terminating trunk port unavailability condition upon request of one of the plurality of agent telephonic units of a selected informational group to interconnect an available terminating trunk port from the common pool of terminating trunk ports to the requesting one of the plurality of agent telephonic units.

13. The automatic call distribution system of claim 1 in which the voice path connection causing means responsive to the requesting means includes at least one terminating trunk port associated with the multiport switch, a loop around trunk having an end connected with the at least one terminating trunk port and another end connected with an incoming trunk port of the multiport switch, means for storing in a memory of the automatic call distributor an outdial protocol associated with the incoming trunk port, and means responsive to the request enabling means for initiating the outdial protocol to direct the automatic call distributor to outdial to the first internal telephonic unit.

14. The automatic call distribution system of claim 13 including a pool of available and unavailable terminating trunk ports, and in which the causing means responsive to the request enabling means includes means responsive to the request enabling means for selecting a single available terminating trunk port when the single available terminating trunk port is not in use from the pool of available and unavailable terminating trunk ports placed in a queue.

15. The automatic call distribution system of claim 14 in which the causing means includes means for organizing the agent telephonic units into informational groups, means for organizing the terminating trunk ports into informational groups corresponding to the agent telephonic unit informational groups, and means responsive to the request enabling means for selecting the single available terminating trunk port from the informational group corresponding to the agent telephonic unit requesting the voice path connection.

16. The automatic call distribution system of claim 1 including a second automatic call distributor, and in which the causing means responsive to the request enabling means includes means for selectively connecting the first established voice path between a second internal telephonic unit connected with the second automatic call distributor and the agent telephonic unit.

17. In an automatic call distribution system with an automatic call distributor having a multiport switch for selectively interconnecting calls from a plurality of external telephonic units of an external telephonic network with a plurality of internal telephonic units including a plurality of agent telephonic units of the call distribution system, the improvement being an emergency conference call system, comprising:

a plurality of conferencing telephonic units for receipt of a voice connection through the multiport switch to an existing call between one of the plurality of external telephonic units and one of the plurality of agent telephonic units;

means associated with the automatic call distributor for selectively interconnecting available ones of the plurality of conferencing telephonic units, when the conferencing telephonic units are not in use, upon request from an agent at the one agent telephonic unit to create a conference call between the one agent telephonic unit, the one external telephonic unit and the conferencing telephonic unit; and means for storing information concerning the conference call including information of at least one of (a) a time when the conference call was requested, (b) a telephone number of the requesting agent telephonic unit, (c) a port identification number of the agent telephonic unit requesting the conference call or (d) a conferencing telephonic unit port identification number of the conferencing telephonic unit selectively interconnected with the one agent telephonic unit in response to the conference call request by the one agent telephonic unit.

18. The automatic call distribution system of claim 17 in which the conference call information storing means includes a paper printer for printing the information.

19. The automatic call distribution system of claim 17 in which the stored information includes all of the information defined by (a), (b), (c) and (d).

20. The automatic call distribution system of claim 17 in which the stored information includes an indication that no one of the conferencing telephonic units was available for interconnection with the one agent telephonic unit.

21. In an automatic call distribution system with an automatic call distributor having a multiport switch controlled by a central processing unit for selectively interconnecting calls from external telephonic units of an external telephonic network with internal telephonic units including agent telephonic units of the call distribution system, the improvement being a method of establishing a conference call, comprising the steps of:

requesting at one of the agent telephonic units joinder of a first internal telephonic unit into a first existing voice path between the requesting agent telephonic unit and one of the external telephonic units to create a second voice path between the agent telephonic unit and the first internal telephonic unit;

associating a gate with a pool of internal telephonic units including the first internal telephonic unit and other internal telephonic units;

automatically selecting the first internal telephonic unit from the pool of internal telephonic units associated with the gate; and causing the automatic call distributor to join the first internal telephonic unit with the first voice path between the requesting agent telephonic unit and the one external telephonic unit including establishing the second voice path with the gate associated with the pool of other internal telephonic units including the first internal telephonic unit while uninterruptedly maintaining the first voice path with the one external telephonic unit to create a conference call between the agent telephonic unit, the one external telephonic unit and the first internal telephonic unit.

22. The method of claim 21 in which the step of causing the automatic call distributor to join the first internal telephonic unit includes the steps of selectively organizing the plurality of agent telephonic units into informational groups, selectively associating the agent telephonic unit informational groups with a plurality of terminating trunk ports connected with the multiport switch, and selectively connecting the second voice path between one of the plurality of terminating trunk ports from one of the informational groups to the agent telephonic unit requesting the second voice path in response to the agent telephonic unit requesting the second voice path.

23. The method of claim 22 including the steps of placing at least one of the informational groups of terminating trunk ports associated with at least one of the informational groups of agent telephonic units, when the at least one group of terminating trunk ports is not in use, in a queue of available terminating trunk ports.

24. The method of claim 23 including the step of searching the informational group queue of terminating trunk ports associated with the informational group of the agent telephonic unit requesting the voice path for an available terminating trunk port.

25. The method of claim 24 including the step of seizing one of the available terminating trunk ports from the informational group queue of terminating trunk ports.

26. The method of claim 25 in which the step of causing the automatic call distributor to join the first internal telephonic unit includes the steps of directing a call established by the first existing voice path selectively interconnected between the external telephonic unit and the agent telephonic unit to another automatic call distributor, and automatically outdialing at the other automatic call distributor to the first internal telephonic unit.

27. The method of claim 25 in which the step of causing the automatic call distributor to join the first internal telephonic unit includes the steps of routing the call interconnected between the external telephonic unit and the agent telephonic unit to the available terminating trunk port across a loop around trunk interconnected between the terminating trunk port and an incoming trunk port of the automatic call distributor, storing in a memory of the automatic call distributor an outdial protocol associated with the incoming trunk port, and executing the outdial protocol to direct the automatic call distributor to outdial the first internal telephonic unit in response to the routing of the call to the incoming trunk port through the loop around trunk.

28. The method of claim 24 in which the step of searching includes the step of accessing the informational group queue on a last in, first out basis.

29. The method of claim 25 including the steps of returning the available terminating trunk port seized from the informational group queue to an appropriate location in the informational group queue of the group of terminating trunk ports after releasing the first internal telephonic unit from the conference call, and updating a plurality of pointers to the terminating trunk port.

30. The method of claim 22 including the steps of establishing a common pool of terminating trunk ports unassociated with any informational group of agent telephonic units, and connecting an available terminating trunk port from the common pool of terminating trunk ports to the agent telephonic unit requesting the creation of the second voice path in response to a terminating trunk port unavailability condition of the plurality of terminating trunk ports associated with the informational group of the requesting agent telephonic unit.

31. The method of claim 21 in which the step of requesting joinder of the first internal telephonic unit includes the step of manually actuating an emergency key attached to the requesting agent telephonic unit to initiate the conference call between the one external telephonic unit, the requesting agent telephonic unit and the first telephonic unit.

32. The method of claim 31 including the step of disconnecting the second voice path between the first internal telephonic unit and the agent telephonic unit in response to actuation of the emergency key at the agent telephonic unit while the conference call is in progress.

33. The method of claim 31 including the step of lighting an emergency lamp at the agent telephonic unit in response to actuation of the emergency key to request the joinder of the first internal telephonic unit.

34. The method of claim 33 including the step of turning off the emergency lamp at the agent telephonic unit in response to disconnecting the second voice path between the agent telephonic unit and the first internal telephonic unit.

35. The method of claim 21 including the steps of placing the external telephonic unit on hold, outdialing a different telephonic unit via the automatic call distributor to establish a voice path connection between the different telephonic unit and the agent telephonic unit, removing the external telephonic unit from hold to establish a three unit conference call between the agent telephonic unit, the different telephonic unit and the external telephonic unit, and connecting the second voice path between the first internal telephonic unit and the agent telephonic unit in response to a request at the agent telephonic unit to establish a four unit conference call between the agent telephonic unit, the different telephonic unit, the first internal telephonic unit and the external telephonic unit.

36. In an automatic call distribution system with an automatic call distributor having a multiport switch for selectively interconnecting calls from external telephonic units of an external telephonic network with internal telephonic units including agent telephonic units of the call distribution system, the improvement being a method of establishing a conference call, comprising the steps of:

initiating the automatic call distributor to selectively interconnect a voice path between one of the plurality of agent telephonic units and a first internal telephonic unit to create a conference call between the one agent telephonic unit, one of the plurality of the external telephonic units and the first internal telephonic unit; and storing information concerning the conference call including information about at least one of (a) a time when the conference call was requested, (b) a telephone number of the agent telephonic unit, (c) a port identification number of the agent telephonic unit or (d) an internal telephonic unit port identification number of the first internal telephonic unit selectively interconnected with the agent telephonic unit in response to the initiation of the automatic call distributor selectively interconnecting the voice path.

37. The method of claim 36 including the step of printing a conference report including at least one of the information a), b), c), or d) at a paper printer connected with the multiport switch of the automatic call distributor.

* * * * *